AUTOMATIC RECLOSING CIRCUIT BREAKER

Original Filed June 6, 1941 5 Sheets-Sheet 1

INVENTORS
WILLIAM D. KYLE JR.
CARL SCHINDLER
BY
Austin R. Woolfolk
ATTORNEY

AUTOMATIC RECLOSING CIRCUIT BREAKER

Original Filed June 6, 1941 5 Sheets-Sheet 2

INVENTORS
WILLIAM D. KYLE JR.
CARL SCHINDLER

BY Anton R. Woolfolk
ATTORNEY.

AUTOMATIC RECLOSING CIRCUIT BREAKER

Original Filed June 6, 1941 5 Sheets-Sheet 3

INVENTORS
WILLIAM D. KYLE JR.
CARL SCHINDLER
BY
Anton R. Woodcock
ATTORNEY.

AUTOMATIC RECLOSING CIRCUIT BREAKER

Original Filed June 6, 1941 5 Sheets-Sheet 4

INVENTORS
WILLIAM D. KYLE JR.
CARL SCHINDLER

BY Arthur R. Woolfolk
ATTORNEY.

AUTOMATIC RECLOSING CIRCUIT BREAKER

Original Filed June 6, 1941 5 Sheets-Sheet 5

INVENTORS
WILLIAM D. KYLE JR.
CARL SCHINDLER
BY Arthur R. Woolfolk
ATTORNEY.

Reissued Aug. 5, 1952

Re. 23,532

UNITED STATES PATENT OFFICE 23,532

AUTOMATIC RECLOSING CIRCUIT BREAKER

William D. Kyle, Jr., Milwaukee, and Carl Schindler, Wauwatosa, Wis., assignors to McGraw Electric Company, a corporation of Delaware Original No. 2,477,067, dated July 26, 1949, Serial No. 396,850, June 6, 1941. Application for reissue November 19, 1951, Serial No. 257,056

13 Claims. (Cl. 200—89)

Matter enclosed in heavy brackets [ ] appears in the original patent but forms no part of this reissue specification; matter printed in italics indicates the additions made by reissue.

This invention relates to automatic reclosing circuit breakers.

Objects of this invention are to provide an automatic reclosing circuit breaker in which a fully automatic reclosing circuit breaker is provided which automatically opens upon an electrical overload and automatically closes after a predetermined interval, and which is so constructed that if this opening and reclosing operation occurs a predetermined number of times in rapid succession, the circuit breaker will automatically lock itself in open position, and in which if the opening and reclosing operations occur less than the predetermined number of times, the tripping mechanism will automatically reset itself so that the full predetermined number of operations in rapid succession will be required for any subsequently occurring fault.

Further objects of this invention are to provide an automatic reclosing circuit breaker in which the lock-out mechanism is so arranged as to permanently bias the circuit breaker in open position when the lock-out mechanism operates, which is not dependent upon any pawl, ratchet, or other type of latch which might jar loose if the circuit breaker were subjected to vibration or jarring, or which, when defective for any cause, would allow the circuit breaker to drop closed, but instead in which the circuit breaker when locked out is biased towards open position and remains in open position irrespective of any jarring or other disturbance that might occur, thereby providing a high factor of safety.

Further objects are to provide an automatic repeating circuit breaker in which manual means are provided for tripping the circuit breaker upon manual operation and for resetting the circuit breaker after it has been locked out, in which this manual resetting means is so made that the circuit breaker can operate independently of such manual resetting means if the fault still persists while the circuit breaker is being manually reset, to thereby guard against any severe mechanical blows or shocks being imparted to the operator when he is resetting the circuit breaker.

Further objects are to provide a circuit breaker in which the manual resetting mechanism does not operate for each opening of the circuit breaker but operates only once, moving to the position indicating lock-out when the lock-out occurs, in which the manual reset means is not moved to lock-out position by any blow struck by the actuating mechanism of the circuit breaker, but in which it is moved outwardly by a force of a predetermined value independently of any violent motion that the circuit breaker may be executing, and in which this manual resetting means and manual opening means is electrically dead at all times.

Further objects are to provide an automatic reclosing circuit breaker which not only may be opened by an electrical overload or manually, but also which is so constructed that it will be opened upon the heating beyond a predetermined temperature of the oil in which the circuit breaker is immersed so that when an overload occurs which would heat the circuit breaker but of a value insufficient to cause operation of the circuit breaker, there can be no danger of the burning out of the circuit breaker, but in which automatic opening occurs upon a rise in temperature of the oil beyond a predetermined value.

Further objects are to provide an automatic reclosing circuit breaker in which it is not necessary to use an insulating housing but in which a metal can or housing is provided which is completed by a metal cap, all exposed parts of the apparatus being electrically dead at all times except for two terminal members which are carried by the cap and project from the upper side of the cap, the can being free from any holes or apertures or bushings therethrough and being open only at the top to thereby guard against loss of oil.

Further objects are to provide a reclosing circuit breaker in which all parts of the circuit breaker are carried from a top metal cap, the metal cap being clamped to a metal can containing oil, the construction being such that the circuit breaker may be lifted from the can, if desired, for inspection or repair without removing the can from its mounting, thus facilitating periodic inspection or repair without the necessity of removing the can from the pole or other support upon which it may be mounted, the metal can itself also providing for rapid heat dissipation.

Further objects are to provide an automatic reclosing circuit breaker which cannot be manually held in closed position against an electrical overload, which has a quick break and a quick make no matter in what manner it may be operated, whether by electrical overload, manually or by the heating of the oil, and in which the rapidly moving parts of the circuit breaker are hydraulically cushioned.

Further objects are to provide an automatic reclosing circuit breaker which when it closes always comes back to a definite predetermined position irrespective of the number of operations or the wear of the parts, which has a wiping ac-

1 tion of the contacts thereby maintaining good electrical contact without a gradual increase in resistance due to oxidation from arcing, in which independent radially renewable arcing contacts are provided which receive the final arc and thus avoid any injury to the main contacts, the construction being such that the circuit breaker will always operate at its predetermined overload value irrespective of the length of time it may have been in operation or the number of times that it has operated.

Further objects are to provide an automatic reclosing circuit breaker which does not employ any fragile or delicate parts such as a ratchet or clockwork mechanism to obtain the time delay but which utilizes the oil in which the circuit breaker is immersed, hydraulic time delay means being provided and also hydraulic means being provided for tripping the means for locking the circuit breaker in open position after a predetermined number of operations when such operations occur in rapid succession, and in which the construction is such that even if the oil level becomes excessively low, the lock-out mechanism will function due to the sudden evolution of gas or excessive heating of the remaining oil to thereby lock the circuit breaker in open position under such abnormal condition.

Further objects of this invention are to provide an automatic circuit breaker which will take care of the unusual condition of a low electrical overload not sufficient to fully operate the circuit breaker but which might cause continued repeated partial operations, the construction being such that the evolution of gas will cause the hydraulic tripping mechanism to operate the lock-out mechanism to thereby lock the circuit breaker in open position under these unusual conditions, the construction also providing the additional safety feature of locking the circuit breaker out under excessively heavy overload where a great amount of heat is generated and gas produced, the apparatus being so arranged that an automatic hydraulic trip mechanism will operate from this sudden evolution of gas and will lock the circuit breaker open.

Embodiments of the invention are shown in the accompanying drawings, in which.

Figure 2:
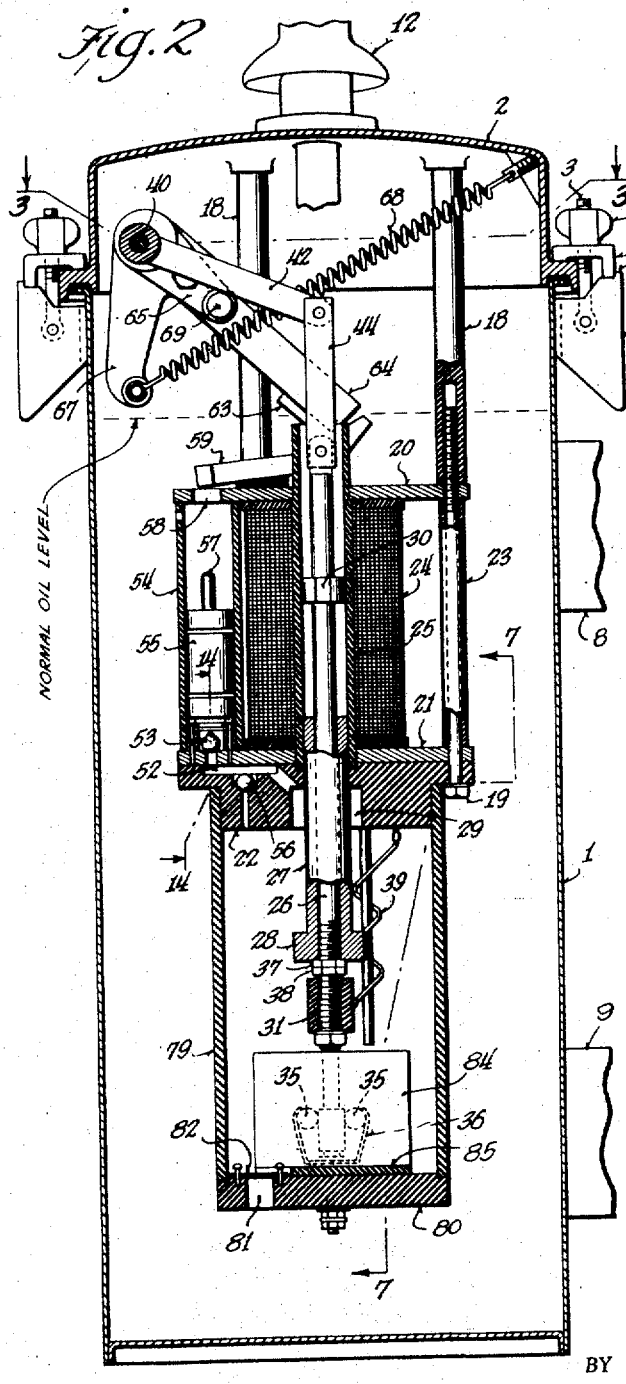
Figure 2 is an enlarged sectional view on the line 2—2 of Figure 1, such view also corresponding to a section on the line 2—2 of Figure 3.
Figure 1:
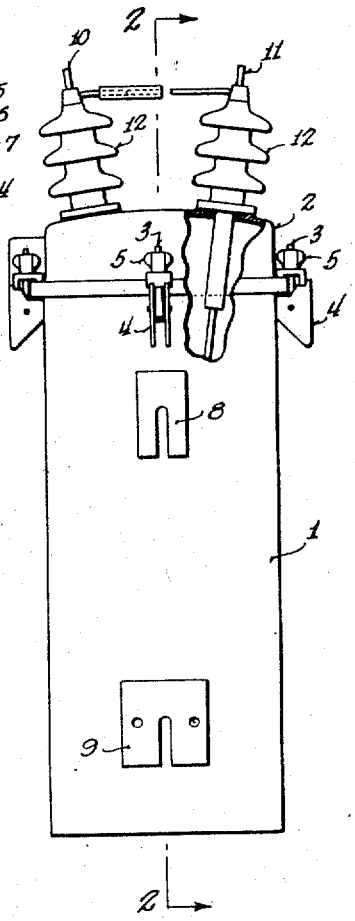
Figure 1 is a side elevation, partly broken away, of the automatic repeating circuit breaker.

The circuit breaker is oil immersed and is mounted within the oil containing metal can 1 which is provided with a removable top 2 removably held to the can in any suitable manner. A convenient way of attaching the top to the can is by means of a plurality of bolts 3 which are pivotally mounted between spaced ears 4 carried by the can and which are provided with wing nuts 5. The wing nuts are adapted to bear against L-shaped clamping plates 6 whose downwardly extending portion is adapted to rest upon the upper face of the ears 4, a suitable lug 7 being provided on each of the ears to prevent the clamping plate 6 from sliding off the upper surface of the ears 4. A suitable sealing gasket is positioned between the flanged upper end of the can and the annular recessed portion of the cover 2, as shown most clearly in Figure 2.

Any suitable attaching means as indicated at 8 and 9 are provided on the can so that the can may be attached to a pole or other suitable support.

The cap or cover 2 is provided with a line and load terminal indicated respectively at 10 and 11, and these terminals are carried by insulating bushings 12, 12.

Figure 15:
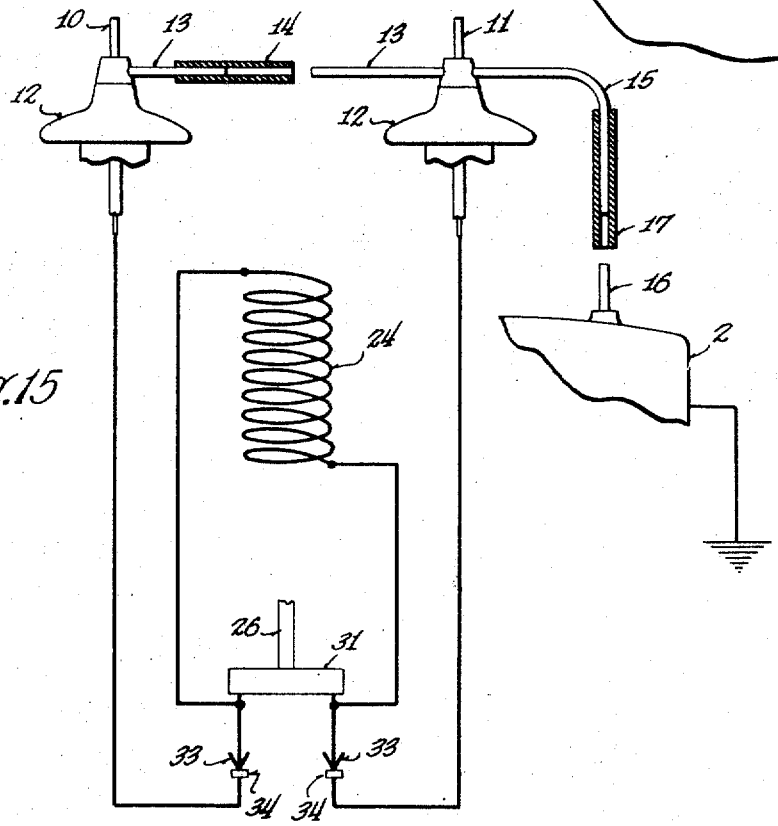
Figure 15 is a diagrammatic view showing the circuit arrangement and the protective gaps.

Normally the can 1 is grounded as shown in the diagrammatic view Figure 15. It is preferable to provide two gaps, one between the line and load terminals 10 and 11 and the other between load terminal 11 and the grounded can 1. For example, the electrodes or rods 13 may extend towards each other and may be spaced apart the desired distance to provide a gap for a lightning discharge.

One of the electrodes 13 projects into a fiber tube 14 which has an open end spaced from the other electrode so that it acts to snuff out or blow out any arc that may be formed between the electrodes, such arc passing through the tube and the fiber or other suitable material evolving an arc extinguishing gas.

The other gap is formed between the electrode 15 carried by the load terminal 11 and an electrode 16 projecting upwardly from the top 2. The electrode 15 extends into a fiber tube 17 so as to provide an arc extinguishing means. It is to be noted that the gap between the electrodes 15 and 16 is smaller than the gap between the electrodes 13 so that a lightning discharge will find an immediate path to the ground. The construction is such that there will be substantially no follow-through current as the arc will be extinguished at one or the other gaps practically instantaneously.

The automatic reclosing circuit breaker is suspended in its entirety from the metal cover 2. For example, the metal cover may be provided with a plurality of downwardly extending insulating posts 18 which are secured at their upper ends to the metal cover and which have internally threaded lower portions into which elongated attaching screws 19 pass. These attaching screws hold the upper metal plate 20 and the lower metal plate 21 and the lower insulating annular block or collar 22 in place, the metal plates 20 and 21 being spaced apart by suitable spacers 23 which may be insulating tubes if so desired. The electromagnetic coil or solenoid 24 is positioned between the plates, suitable insulating end pieces being provided, as shown in Figure 2. Centrally of the coil an insulating sleeve or tube 25 is provided.

A non-magnetic operating rod 26 for the circuit breaker extends upwardly centrally of the insulating tube 25 and on this rod a plunger 27 formed of magnetic material is freely slidable. This plunger 27 or armature is provided with an enlarged or shouldered lower portion 28 which acts as a piston when passing within the cylindrical chamber 29 formed in the collar or block 22 for a purpose hereinafter to appear.

The operating rod 26 of the circuit breaker rigidly carries a spider like stop 30 which loosely fits within the sleeve 25 and which serves as an abutment against which the upper end of the magnetic plunger 27 strikes when the coil 24 is energized by an overload current. When this occurs, the plunger 27 is suddenly drawn upwardly into the coil and strikes the abutment 30, carrying the rod 26 upwardly.

Figure 7:
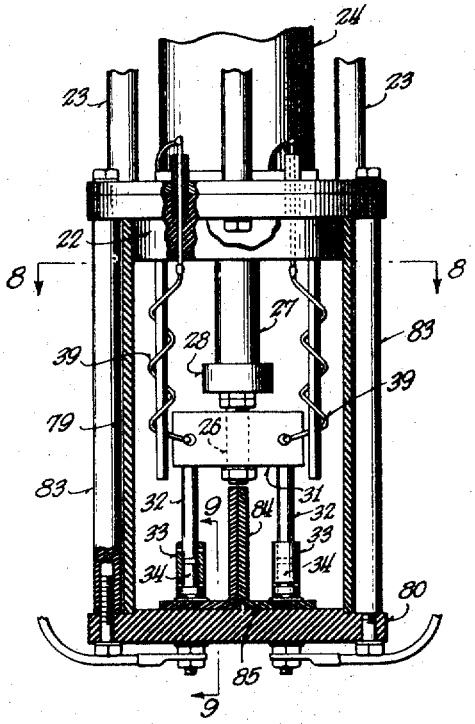
Figure 7 is a fragmentary sectional view on the line 7—7 of Figure 2.

The lower end of the rod 26 is rigidly secured to an insulating cross-head 31, see Figure 7. The cross-head 31 carries a pair of contact rods 32 to which are rigidly attached a pair of contact sleeves 33, see Figures 7 and 9. The contact sleeves 33 normally engage the stationary contact pins 34. These stationary contacts or contact pins 34 are connected to the line and load terminals 10 and 11 hereinbefore described.

Figure 9:
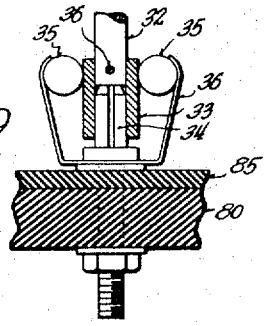
Figure 9 is a sectional view on the line 9—9 of Figure 7, such view showing the movable contact in section.

It is to be noted particularly with reference to Figures 7 and 9 that the stationary contact pins 34 constitute stops against which the lower ends of the contact rods 32 abut when the circuit breaker is closed.

It is preferable to make the contact pins or stationary contacts 34 split as shown in Figure 9 and to have the movable contacts or sleeves 33 engage the pins 34 with a wiping motion to insure a clean contact at all times. The arcing upon segregation of the movable and stationary contacts does not occur between the sleeves 33 and the pins 34 but separate arcing contacts are provided in the form of conducting rollers 35 which may be of metal and which are carried by leaf springs 36 clamped in place as shown in Figure 9. These arcing contacts 35 are the last members that engage the movable contacts 33. All arcing occurs between the arcing contacts 35 and the outer surfaces of the sleeves 33, thus maintaining the inner surfaces of the sleeves and the outer surfaces of the pins 34 in good condition free from pitting although the circuit breaker may have operated a great number of times.

The arcing contacts are readily renewable and it is also easy to renew the sleeves 33, if this becomes necessary, by driving out the locking pin or other suitable securing means 36, see Figure 9, and replacing the old sleeve 33 with a new sleeve. This very rarely happens, however, for the arcing occurs, as stated, between the outer surfaces of the sleeves 33 and the arcing contacts 35.

It is to be noted particularly that the upper ends of the stationary contacts or pins 34 form a definite stop for arresting the downward motion of the movable portions of the circuit breaker and consequently the circuit breaker, together with the magnetic core or plunger 27, see Figures 2 and 7, will always come to rest at exactly the same point so that the circuit breaker will always respond to the same current.

If, on the other hand, the active contact had been a butt contact and the arcing had occurred between the butt contact, there would be a gradual wearing away of this contact through continued use of the circuit breaker and consequently the circuit breaker would operate only at an increased current as the time of service increased.

However, in the invention herein described, the circuit breaker will always respond at exactly the same predetermined value of overload current.

For wide adjustments in current at which the circuit breaker will respond, coils 24 of different number of turns are employed but for ordinary adjustments through a comparatively extensive range the same coil can be used. The adjustment is obtained by screwing the adjusting nut 37, see Figure 2, upwardly and thereafter locking it by the lock nut 38. This adjustment moves the plunger 27 upwardly the desired distance so that the upper end of the plunger comes to rest at a higher point within the coil 24 and consequently so that a lesser current is required to cause operation of the circuit breaker. In the position of adjustment shown in Figure 2, the circuit breaker has been set to respond to the maximum current for the particular coil 24.

The contact rods 32 are connected by flexible leaders 39 with opposite ends of the coil 24 so that the coil 24, as may be seen from Figure 15, is in series between the line and load terminals 10 and 11 and directly across the movable contacts 33.

Figure 3:
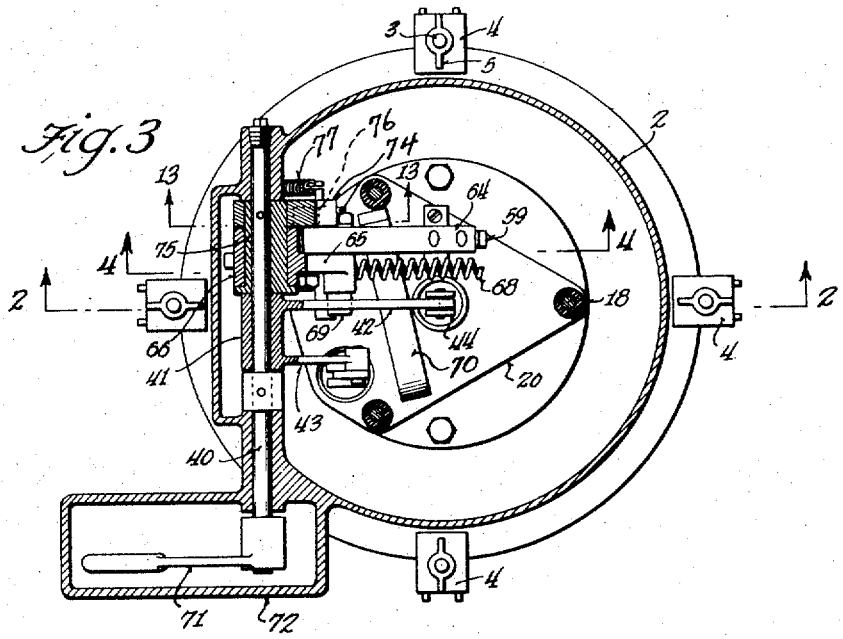
Figure 3 is a sectional view on the line 3—3 of Figure 2.
Figure 10:
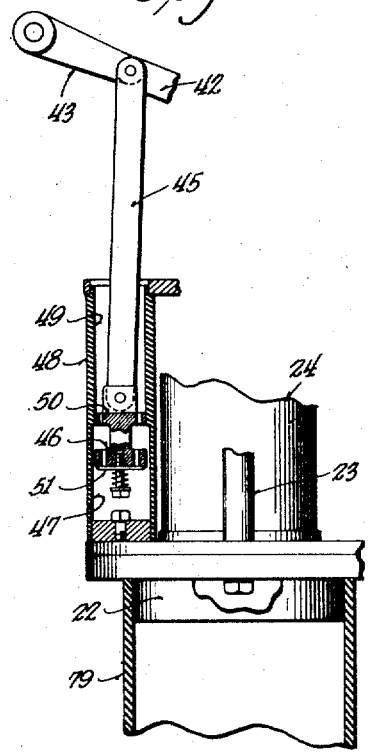
Figure 10 is a sectional detail of the time delay means.
Figure 8:
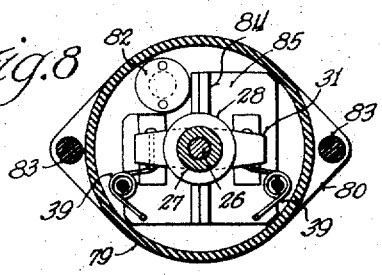
Figure 8 is a sectional view on the line 8—8 of Figure 7.

Referring to Figures 2 and 3, it will be seen that a rock shaft 40 extends transversely of the cover or cap 2. A rocking sleeve 41 is loosely mounted on this rockshaft and is provided with a relatively long arm 42 and a relatively shorter arm 43 which constitute, together with the sleeve 41, a unitary member freely rockable upon the shaft 40. The relatively long arm 42 is connected by means of a pair of insulating links 44 with the upper end of the operating rod 26 of the circuit breaker, as shown most clearly in Figure 2. Thus when the circuit breaker is driven to open position upon the occurrence of an overload, the arm 42 and the arm 43 are rocked upwardly. The arm 43 is connected by means of insulating links 45 with a plunger 46, which is normally positioned within the relatively large portion 47 of the bore of a cylinder 48, see Figure 10.

The cylinder is provided with a relatively smaller upper bore 49 within which a spide-like guiding member 50 of the plunger 46 rides. When the arms 42 and 43 are rocked upwardly, the plunger 46 passes from the relatively large bore 47 into the relatively small bore 49. However, it is freely drawn upwardly in the relatively small bore 49 as the spring pressed valve 51 yields and allows oil to pass downwardly through the apertures in the plunger 46 into the space below the plunger and no material retardation occurs, thereby allowing the circuit breaker to open with a very quick stroke.

However, after the circuit breaker has opened, it cannot immediately close for there is a time delay produced by the downward travel of the plunger 46 through the relatively small bore or constricted bore 49, the oil leaking out around the sides of the plunger 46 and retarding the downward motion of the circuit breaker. However, as the circuit breaker approaches closed position, the plunger 46 rides out of the constricted passage 49 into the larger passage 47 of the cylinder 48 and the circuit breaker completes its closing stroke with a quick motion.

It is of course obvious that a small passage could be provided beneath the piston 46 through the wall of the cylinder or else through the piston itself to provide for the escape of oil or, as stated hereinabove, the oil may leak around between the piston and the cylinder. Thus a predetermined time delay is imposed upon the circuit breaker after it has opened to thereby provide an interval of time before it will close so that if the fault is only a temporary fault, the circuit breaker will stay closed after it has once opened. If the fault persists, it is obvious that the circuit breaker will again make a quick opening stroke and will also be retarded on its closing stroke.

It is desirable to provide means for permanently locking the circuit breaker in open position after a predetermined number of rapidly succeeding operations. This is readily accomplished by providing a tripping means actuated by oil pumped by the circuit breaker upon operation. As shown in Figure 2, the collar or head 22 is provided with a cylinder like aperture 29 within which the piston or enlarged shouldered portion 28 of the plunger 27 passes during the completion of the upward stroke of the plunger. This also provides a hydraulic cushion for the plunger and thus materially reduces wear. The oil from the chamber 29 passes through a port 52 past a check valve 53 into the lower end of the cylinder 54, see Figure 2.

A piston 55 is positioned within this cylinder and is moved up a predetermined distance on each opening stroke of the plunger 27. The check valve seats and prevents the return of the oil from the bottom of the cylinder. The piston or head 28 of the plunger 27 freely passes from the cylinder 29 as a relief check valve 56 is provided to allow oil to pass back into the cylinder 29 above the piston 28.

It is obvious that after a certain number of operations, the piston 55 of the tripping device will move upwardly a sufficient distance to project the pin 57 carried thereby through an opening 58 in the top plate 20 and against the trip latch 59, thereby raising the trip latch. This raising of the trip latch, as will be described hereinafter, releases the lock-out mechanism and locks the circuit breaker in open position. However, it is desirable to have this lockout of the circuit breaker occur not only when there has been a predetermined number of operations of the circuit breaker, but also only when these operations occur in rapid succcession.

Figure 14:
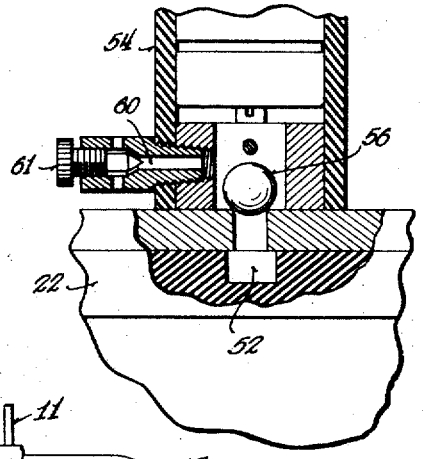
Figure 14 is a sectional view on the line 14—14 of Figure 2.

If, for the purpose of illustration, it is assumed that the circuit breaker is to lock open after three operations in quick succession, it obviously is not desirable for the circuit breaker to lock open after two operations occurring in quick succession and a third operation occurring at a very much later time. This result is accomplished by providing an adjustable leak from the cylinder 54 at a point beneath the piston 55. As shown in Figure 14, which is an enlarged view of the lower portion of the cylinder 54, it will be seen that a leak passage 60 has been provided which is adjustable by means of a needle valve 61 to thereby determine the rate at which the leak will occur. If, for example, less than the predetermined number of quickly succeeding operations has occurred, the piston 55 will settle downwardly as the oil flows through the leak passage 60 and will finally come to rest at the bottom part of its stroke, as shown in Figure 2, thereby resetting the tripping mechanism to its initial position.

This feature is of particular importance for if the circuit breaker performs one or two operations and the fault clears, the circuit breaker still will have its full number of times for a sequential rapid operation in the event any subsequent fault occurs.

Figure 4:
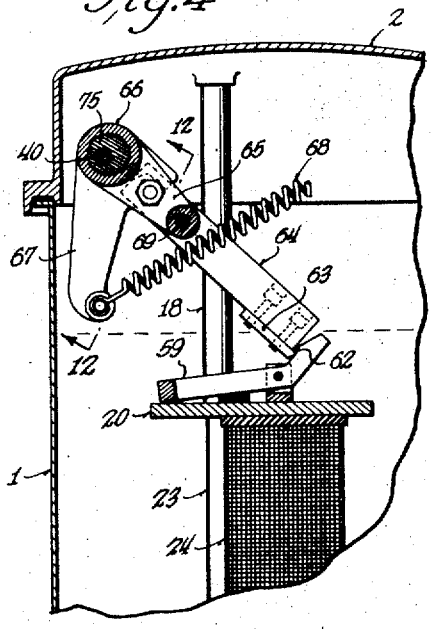
Figure 4 is a fragmentary sectional view on the line 4—4 of Figure 3.

Returning to the latching and tripping mechanism with particular reference to Figures 2 and 4, it will be seen that the latching lever is provided with a latching portion 62 beneath which a latching plate 63 is normally held, the latching plate 63 being of metal and being carried by an insulating lever 64. The lever 64 is rigidly bolted to a metal lever 65, which latter is rigid with a sleeve 66. A second lever 67 is also rigid with the sleeve 66 and is spring urged in a counterclockwise direction by means of a spring 68. This spring 68 has its upper end attached at a fixed point within the cap 2, as shown in Figure 2. Therefore, it will be seen that the latch lever 64 is permanently biased towards its uppermost position which will be shown as the description proceeds to be the lock-out position for the circuit breaker.

The lever 65, as will be seen from Figures 2 and 3, is provided with a head or pin 69 positioned directly beneath the lever 42, which latter lever is attached by means of the links 44 with the operating rod 26 of the circuit breaker. Therefore it is apparent that when the trip latch 59 is released, that the circuit breaker will be locked open as the spring 68 will cause the lever 65 with the projection 69 to rock in a counterclockwise direction, see Figure 2, and thus hold the circuit breaker locked open. The circuit breaker will thus be permanently biased towards open position when it is locked out and will not be dependent upon any pawl or any other type of latch of this order which might jar loose and allow the circuit breaker to drop to closed position.

This contingency is avoided by providing the mechanism hereinabove described which permanently biases the circuit breaker towards open position when the circuit breaker is locked open so that there is no tendency of the circuit breaker to close under these conditions although it may be subjected to vibration or jarring.

Figure 5:
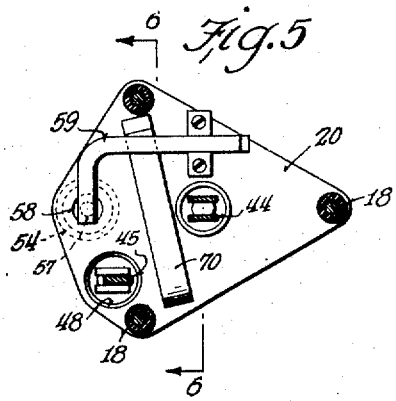
Figure 5 is a view on the top plate and associated parts with the upper portion of the apparatus sectioned off.
Figure 6:
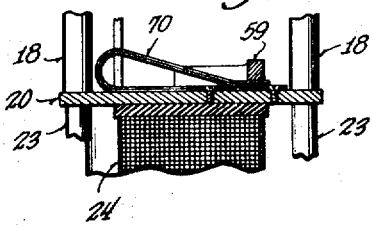
Figure 6 is a sectional detail of the thermostatic tripping means, such view being taken on the section line 6—6 of Figure 5.

It sometimes happens that sufficient current is passed through the coil 24 to abnormally heat the coil with consequent damage to the apparatus without causing operation of the circuit breaker. This is prevented by providing thermal means responsive to the temperature of the oil within the tank 1 for operating the trip latch 59. As may be seen from reference to Figures 3, 5 and 6, a bimetallic folded strip 70 is carried by the upper plate 20 and has its free end positioned beneath the trip latch 59 so that when the bimetallic strip 70 opens up as the oil becomes abnormally heated, it will raise the trip latch 59 and release the trip lever 64, thereby causing a quick opening of the circuit breaker under the influence of the spring 68 and lock-out of the circuit breaker.

Figure 11:
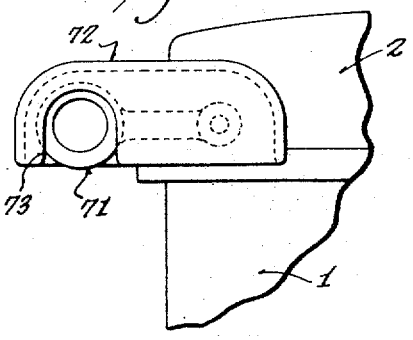
Figure 11 is a detail showing the manual trip and reset mechanism.

Manual means are also provided for opening the circuit breaker with a quick opening stroke. The manual operating means consists of an eyeleted lever 71, see Figures 3 and 11, which is positioned within a hood 72 integral with the cap 2. The hood is open at its lower side and is provided with a cut out portion 73 so that the hook of a switch stick may be inserted in the eye of the lever 71 and the lever may be drawn downwardly to cause a quick opening of the circuit breaker in a manner hereinafter to appear, or to move the lever upwardly back to the position shown in Figure 11 to reset the circuit breaker.

The lever 71 is rigidly attached to the shaft 40 and the shaft 40 rigidly carries a reset lever 74 and an eccentric 75. The eccentric 75 is shown most clearly in Figures 3 and 4. The sleeve 66, see Figures 3 and 4, is loosely mounted on the eccentric 75 and is free to rock about such eccentric independently of any action of the eccentric. However, when the lever 71 is pulled downwardly, the eccentric 75 draws the latch lever 64 upwardly in a slanting direction towards the left as viewed in Figure 4, and thus withdraws the latch plate 63 from the latch portion 62 of the latch lever 59. The spring 68 is now free to act and causes a quick counterclockwise stroke of the lever 65 whose pin or projecting portion 69 strikes the lever 42 and opens the circuit breaker with a quick opening stroke. The circuit breaker will now be permanently locked open until it is manually reset.

Figure 12:
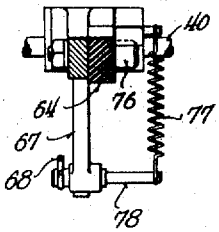
Figure 12 is a sectional view on the slanting section line 12—12 of Figure 4.
Figure 13:
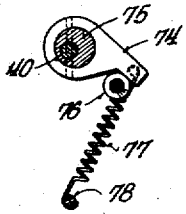
Figure 13 is a fragmentary sectional view on the line 13—13 of Figure 3.

The resetting is accomplished through the medium of the lever 71, the shaft 40 and the reset lever 74, see Figures 3, 12 and 13. The reset lever 74 is positioned above a pin or projection 76 rigid with the latching lever 64, as shown most clearly in Figure 12, the projection 76 being shown in dotted lines in Figure 3. It is clear that when the lever 71 is rocked in a clockwise direction back to its position shown in Figure 11, that the reset lever 74 will engage the pin 76 and will force the latching lever 64 downwardly against the action of the spring 68 to its normal position as shown in Figure 2, thus resetting the circuit breaker. The circuit breaker will thereafter close after a suitable interval determined by the time delay mechanism shown in Figure 10 and hereinabove described.

It is to be noted that a relatively light spring 77 is secured to the reset lever 74 and to a pin 78 carried by the lever 67. The spring 77 is relatively light as compared to the spring 68 and serves merely to hold the lever 71, see Figures 3 and 11, in its uppermost position until the lever 71 has been rocked downwardly when the circuit breaker is locked out.

It is to be noted that the lever 71 does not move downwardly for each operation of the circuit breaker but only moves downwardly when the lock-out mechanism functions or when the lever 71 is manually pulled downwardly for manual operation of the circuit breaker.

It is to be noted particularly that in the resetting operation, the lineman or operator is never subjected to any violent shock even though the fault may still persist when the circuit breaker is reset. When the circuit breaker is reset and the fault still persists, the circuit breaker will instantly move to full open position but nevertheless the lever 42, see Figure 2, will move upwardly away from the projection 69 of the lever 65 and consequently no blow or jar will be imparted to the operator. The only force opposing the resetting is the spring 68 and the force due to the opening stroke of the circuit breaker is not imparted to the resetting and manual release lever 71.

Another feature to be noted is that in the event the circuit breaker is closed and it is desired to manually open it, no matter how slowly the operator pulls downwardly on the lever 71 by means of a switch stick, for instance, as soon as the latch lever 64, see Figure 2, is withdrawn from the latch member 59, the circuit breaker will execute a quick opening stroke due to the action of the spring 68 hereinbefore described.

Thus the circuit breaker always has a quick opening stroke no matter whether it is released manually, thermally, or by electrical overload. It also has a quick closing stroke after a certain interval provided by the time delay mechanism as the final closing stroke of the circuit breaker is unimpeded as hereinabove described.

It is preferable to encase the lower portion of the circuit breaker, that is to say, the stationary and movable contacts, within an insulating cylindrical sleeve 79. The upper end of the sleeve 79 is closed, except for the passageways hereinbefore described, by means of the collar or member 22 and the lower end of the sleeve 79 is closed by means of the base member 80. This base member is provided with an oil inlet aperture 81, see Figure 2, which is normally closed by a downwardly seating flap valve 82.

As will be seen from Figure 7, the insulating base member 80 is suspended by means of the insulating rods 83. These rods extend upwardly to the portion 22 and are internally threaded at their upper and lower ends to receive bolts to thereby lock the rods in place and to the base 80. The insulating sleeve or shell 79 is therefore clamped between the insulating head or collar 22 and the insulating base 80.

Figure 16:
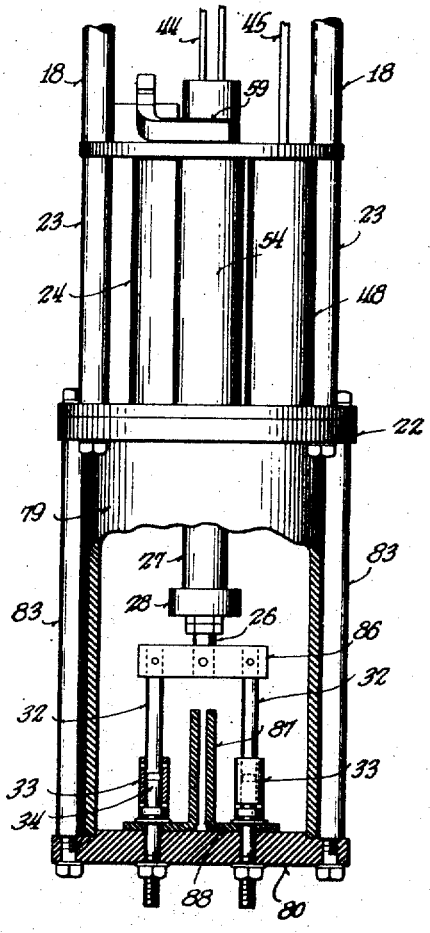
Figure 16 is a view corresponding to Figure 7, showing a further form of the invention.
Figure 17:
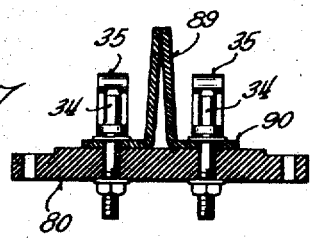
Figure 17 shows a further form of insulating spacer plates.

It is preferable to provide insulating partitions extending upwardly between the spaced contacts. These partitions may take the form of two members 84 of insulating material which have integrally formed, outwardly bent foot portions 85, see Figure 7. The foot portions are clamped in place by the stationary contacts. The members 84 may be in contact with each other, as shown in Figure 7, or may be spaced apart as shown in Figure 16, and hereinafter described, or may be spaced apart at their lower ends and may approach each other or be in contact at their upper ends, as shown in Figure 17.

By having the base or foot portions 85 of the members 84 integral with the vertical portions thereof, it is apparent that any conducting sediment that may settle downwardly between the stationary contacts will not form a bridge path from one contact to the other. Further, in view of the fact that the members 84 and 85 are integral, it is apparent that no conducting sediment can form and lead up to a short gap across which the arc would strike.

By having the lower portion or active contacts of the circuit breaker enclosed by the sleeve 79 and base portion 80 and upper collar or member 22, see Figure 2, it is apparent that under violent overload where a considerable amount of gas is generated, that the tripping plunger 55 will be driven to its uppermost position and will trip the lock-out mechanism and thereby lock the circuit breaker in open position so that a succeeding violent action of the circuit breaker will not be permitted even if the fault persists.

This is a very unusual condition but the construction of this device is such that it will care for this abnormal condition and will save the circuit breaker from the necessity of executing the required number of operations in rapid sequence under an extremely heavy abnormal overload.

This invention is designed to take care of still another abnormal condition where an overload of too small a value occurs to cause complete operation of the circuit breaker at one stroke, but nevertheless might cause a partial opening followed by quick reclosing of the circuit breaker without having the circuit breaker execute a complete opening stroke. It is obvious that the repeated breaking will result in the generation of gas and the gas so generated will force oil into the cylinder 54, thereby driving the tripping plunger 55 upwardly, thus tripping the lock-out mechanism.

Figure 18:
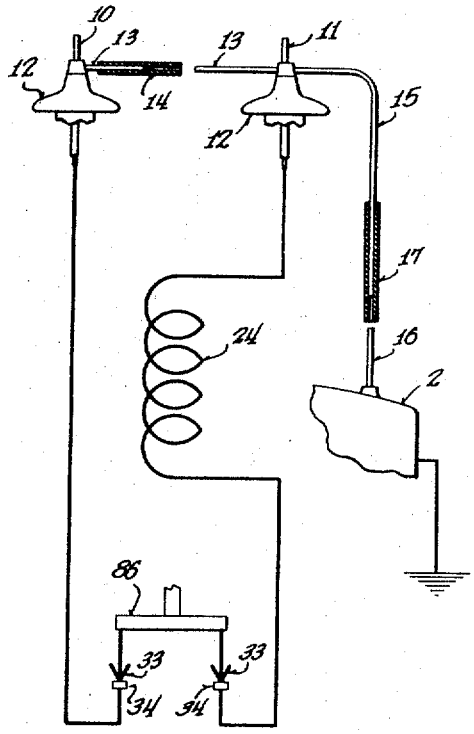
Figure 18 is a diagrammatic view showing the circuit for the form of invention shown in Figure 16 and showing the protective gaps.

In the form of the invention shown in Figure 16, the circuit breaker differs from that previously described in that a metal crosshead 86 is provided and is rigid with the movable contacts 32. In this form of the invention there is no necessity of having the flexible leads 39, as shown in Figure 7. Instead one of the stationary contacts 34 is connected to the line terminal 10 and the other stationary contact 34 is connected to one end of the electromagnetic coil 24, the other end of such coil being connected to the load terminal 11, as shown in Figure 18. The same safety gaps are provided in Figure 18 as described in connection with Figure 15.

In Figure 16 a different form of insulating baffle has been illustrated. These baffles have the same shape as those previously described and consist of the vertical portions 87 and the horizontal foot portions 88, but these baffles are spaced apart to allow an oil space between the baffles. Obviously this form of baffle could be used with Figure 7 or the form shown in Figure 7 could be used with the form shown in Figure 16.

The baffles may also take another form and may be used with either form of the device. As shown in Figure 17, the upright portions of the baffles are indicated at 89 and the horizontal portions at 90. The upstanding portions 89 may engage each other at the upper end but are spaced apart at their lower end to provide an oil space.

It is to be noted also that in a surge condition with a steep wave front the impedance of the coil 24 in the form shown in Figure 15 will cause relatively high difference of potential to exist between the movable contacts 33, whereas in the form of the invention shown in Figure 18 the impedance of the coil 24 does not produce a high voltage difference between the movable contacts 33 as these contacts are directly connected by the metal crosshead 86.

All of the desirable features heretofore outlined in connection with the first form of the invention are obviously obtained by the second form of the invention as well. The construction of the device shown in Figure 17, except for the differences hereinabove enumerated, is identical with that previously described in connection with the first form of the invention.

Although this invention has been described in considerable detail, it is to be understood that such description is intended as illustrative rather than limiting, as the invention may be variously embodied and is to be interpreted as claimed.

We claim:

1. An automatic reclosing circuit breaker comprising contact means, electromagnetic means responsive to an electrical overload for opening said contact means, said contact means being normally biased towards closed position, hydraulic time delay means permanently connected to a part of said contact means for delaying the initial portion of the closing stroke of said contact means, said hydraulic time delay means having a quick final stroke and allowing a quick final closing stroke of said contact means, normally ineffective lock-out means for holding said contact means open, and lock-out means being independent of said time delay means, and means responsive to a number of successive operations of said circuit breaker occurring in rapid succession for rendering said lock-out means effective.

2. An automatic reclosing circuit breaker comprising a pair of contacts, means responsive to an electrical overload for separating said contacts, normally inactive lock-out means for mechanically locking said circuit breaker in open position, and means including hydraulic means having a cumulative action responsive to a number of successive operations of said circuit breaker occurring in rapid succession for moving said lock-out means to lock-out position, said means responsive to an electrical overload normally separating said contacts independently of any operation of said lock-out means.

3. An automatic reclosing circuit breaker comprising a pair of contacts, electromagnetic means responsive to an electrical overload for separating said contacts, said contacts being normally biased towards closed position, lock-out means biased towards lock-out position for locking said circuit breaker in open position, latch means for restraining said lock-out means, cumulative hydraulic means responsive to a number of successive operations of said circuit breaker occurring in rapid succession for releasing said latch means, pumping means actuated by said circuit breaker for pumping fluid into said cumulative hydraulic means, and manual means movable in one direction for opening said circuit breaker and movable in the other direction for resetting said lock-out means.

4. An automatic reclosing circuit breaker comprising a pair of contacts, electromagnetic means responsive to an electrical overload for separating said contacts, said contacts being normally biased towards closed position, lock-out means biased towards lock-out position for locking said circuit breaker in open position, latch means for restraining said lock-out means, said circuit breaker being oil immersed, cumulative hydraulic means responsive to a number of successive operations of said circuit breaker occurring in rapid succession for releasing said latch means, pumping means actuated by said circuit breaker for pumping fluid into said cumulative hydraulic means, manual means for resetting said lock-out means in latched position, and means responsive to the temperature of said oil for tripping said latch means.

5. An automatic reclosing circuit breaker comprising a pair of contacts, electromagnetic means responsive to an electrical overload for separating said contacts, said contacts being normally biased towards closed position, lock-out means biased towards lock-out position for opening said circuit breaker and holding said circuit breaker in open position, latch means for restraining said lock-out means, said circuit breaker being oil immersed, cumulative hydraulic means responsive to a number of successive operations of said circuit breaker occurring in rapid succession for releasing said latch means, pumping means actuated by said circuit breaker for pumping fluid into said cumulative hydraulic means, manual means movable in one direction for resetting said lock-out means and movable in the other direction for releasing said latch means, and means responsive to the temperature of said oil for releasing said latch means.

6. An automatic reclosing circuit breaker comprising a pair of contacts, electromagnetic means responsive to an electrical overload for separating said contacts, said contacts being normally biased towards closed position, lock-out means biased towards lock-out position for opening said circuit breaker and holding said circuit breaker in open position, latch means for restraining said lock-out means, said circuit breaker being oil immersed, cumulative hydraulic means responsive to a number of successive operations of said circuit breaker occurring in rapid succession for releasing said latch means, pumping means actuated by said circuit breaker for pumping fluid into said cumulative hydraulic means, and casing means surrounding said contacts, said cumulative hydraulic means being also responsive to pressure generated within said casing means whereby said cumulative hydraulic means will respond to pressure caused by the generation of gas within said casing means in addition to the response from the pumping of fluid into said cumulative hydraulic means.

7. An automatic reclosing circuit breaker comprising a pair of contacts, means responsive to an electrical overload for separating said contacts, normally inactive lock-out means for mechanically locking said circuit breaker in open position, said circuit breaker having a pumping action, and means including hydraulic means having a cumulative action responsive to a number of successive operations of said circuit breaker occurring in rapid succession for moving said lock-out means to lock-out position, said last mentioned means being also responsive to abnormal gas pressure produced by opening the circuit under excessive load.

8. In a circuit interrupter, separable contacts, *electromagnetic* means for *instantaneously* separating said contacts in response to a predetermined circuit condition to interrupt the circuit, said contacts being biased closed to automatically close the circuit after a circuit interrupting operation, an actuating member adapted to be advanced a predetermined amount during each separation and reclosure cycle of said contacts and to slowly return to a normal position, means positioned to be engaged *and actuated* by said member in response to predetermined advancement thereof for preventing reclosure of said contacts, manually operable means for rendering said reclosure preventing means inoperative, to thereby permit reclosure of said contacts, said manually operable means adapted to occupy one position when said contacts are closed and being movable to a second position to cause opening of said contacts, and said manually operable means being free of said contacts when at said one position so that said contacts may be separated by said *electromagnetic* [electroresponsive] means even when said manually operable means is held at said one position.

9. In a circuit interrupter, separable contacts, *electromagnetic* means for *instantaneously* separating said contacts in response to a predetermined circuit condition to interrupt the circuit, said contacts being biased closed to automatically close the circuit after a circuit interrupting operation, an actuating member adapted to be advanced a predetermined amount during each separation and reclosure cycle of said contacts and to slowly return to a normal position, means positioned to be engaged *and actuated* by said member in response to predetermined advancement thereof for preventing reclosure of said contacts, manually operable means movable from one position to another for causing separation of said contacts, said manually operable means also being movable to render said reclosure preventing means inoperative to thereby permit reclosure of said contacts, and said manually operable means being inoperative to prevent separation of said contacts by said *electromagnetic* [electroresponsive] means even when said manually operable means is held at said one position.

10. In a circuit interrupter, separable contacts, *electromagnetic* means for *instantaneously* separating said contacts in response to a predetermined circuit condition to interrupt the circuit, said contacts being biased closed to automatically close the circuit after a circuit interrupting operation, manually operable means movable from one position to another for causing separation of said contacts, said manually operable means being inoperative to prevent separation of said contacts by said condition responsive *electromagnetic* means even when said manually operable means is held at said one position but preventing closing movement of said contacts when held at said other position.

*11. The interrupter of claim 10 further characterized by said manually operable means including a manually engageable operating arm readily accessible from the exterior of the interrupter and movable to said one position to release said contacts for biased movement to automatically close the circuit and movable to said other position to effect the application of an opening force directly to said contacts, and including a trip-free connection whereby said arm on a closing movement can be freely moved manually without being subjected to any substantial resistance should said condition responsive electromagnetic means be in the contemporaneous act of opening said contacts and whereby on an opening movement said arm is effective to maintain said contacts open out of control of said condition responsive electromagnetic means.*

*12. The interrupter of claim 10 further characterized by the interrupter having a hooded enclosure and by the manual means including a lever arm pivotally carried by said interrupter and having a handle portion engageable by the hook of a switch stick, and extending exteriorly of said interrupter into said hooded enclosure and having an actuating portion extending interiorly of said interrupter, connecting means between said actuating portion of said lever arm and said contacts to prevent reclosure of said contacts whenever said handle portion of said lever arm is pulled downwardly out of said hooded enclosure, said connecting means being trip-free with respect to said condition responsive electromagnetic means, said lever arm being pivotally displaceable to move said contacts toward closed position subject to overriding control of said condition responsive electromagnetic means upon pushing said handle portion upwardly into said hooded enclosure.*

*13. The interrupter of claim 10 further characterized by said manually operable means com-*

*prising journal means on said interrupter, a lever arm pivotally mounted in said journal means and having a hood-enclosed handle portion extending outwardly of the interrupter in an accessible position, said handle portion of said lever arm being adapted to engage the hook of a switch stick, said lever arm being selectively pivotally displaceable in said journal means upon moving said handle portion between a shielded up position and an exposed down position corresponding to said one position and said other position of said manually operable means, respectively, and a mechanical driving connection between said lever arm and said separable contacts, said lever arm being pivotally displaceable upon moving said handle portion to said down position to retain said contacts in separated condition out of control of said condition responsive electromagnetic means, said driving connection being trip-free with respect to said condition responsive electromagnetic means, said lever arm being pivotally displaceable to move said contacts toward closed position subject to overriding control of said condition responsive electromagnetic means upon moving said handle portion to said up position.*

WILLIAM D. KYLE, JR.
CARL SCHINDLER.

REFERENCES CITED

The following references are of record in the file of this patent or the original patent:

UNITED STATES PATENTS

| Number | Name | Date |
|---|---|---|
| 508,652 | Thomson | Nov. 14, 1893 |
| 689,929 | Suren | Dec. 21, 1901 |
| 716,475 | Read | Dec. 23, 1902 |
| 798,082 | Sundh | Aug. 29, 1905 |
| 1,307,848 | Burnham | June 24, 1919 |
| 1,604,669 | Van Valkenburg | Oct. 26, 1926 |
| 1,737,649 | Edsall | Dec. 3, 1929 |
| 1,805,082 | Edsall | May 12, 1931 |
| 2,053,944 | Cooney | Sept. 8, 1936 |
| 2,069,082 | Walle | Jan. 26, 1937 |
| 2,128,999 | Frank et al. | Sept. 6, 1938 |
| 2,215,792 | Jennings | Sept. 24, 1940 |
| 2,268,229 | Walle | Dec. 30, 1941 |
| 2,298,143 | May | Oct. 6, 1942 |
| 2,318,421 | Rawlins et al. | May 4, 1943 |
| 2,459,327 | Kyle, Jr., et al. | Jan. 18, 1949 |